July 31, 1962

E. F. OBEAR 3,046,707

CUT-OFF SAW

Filed April 11, 1960

EDWARD F. OBEAR,
INVENTOR.

BY Warren T. Jessup
ATTORNEY.

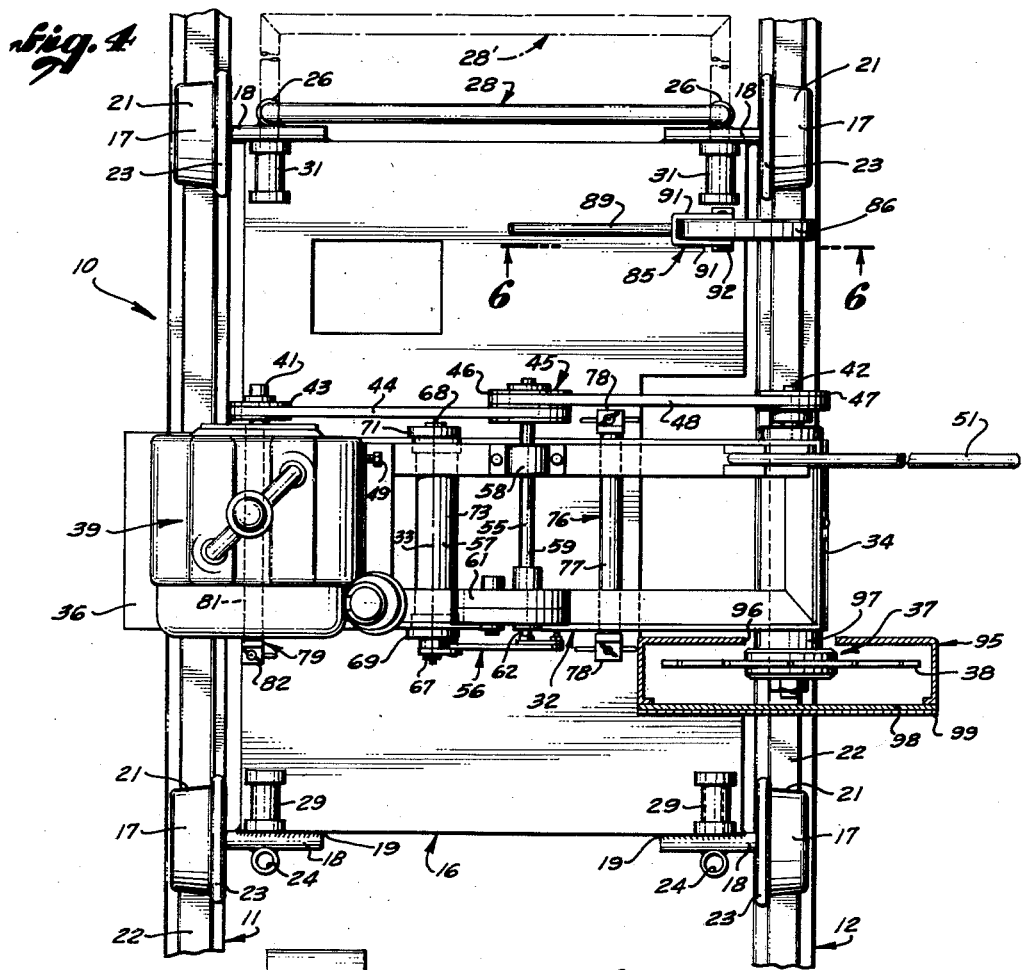

July 31, 1962  E. F. OBEAR  3,046,707
CUT-OFF SAW
Filed April 11, 1960  3 Sheets-Sheet 3
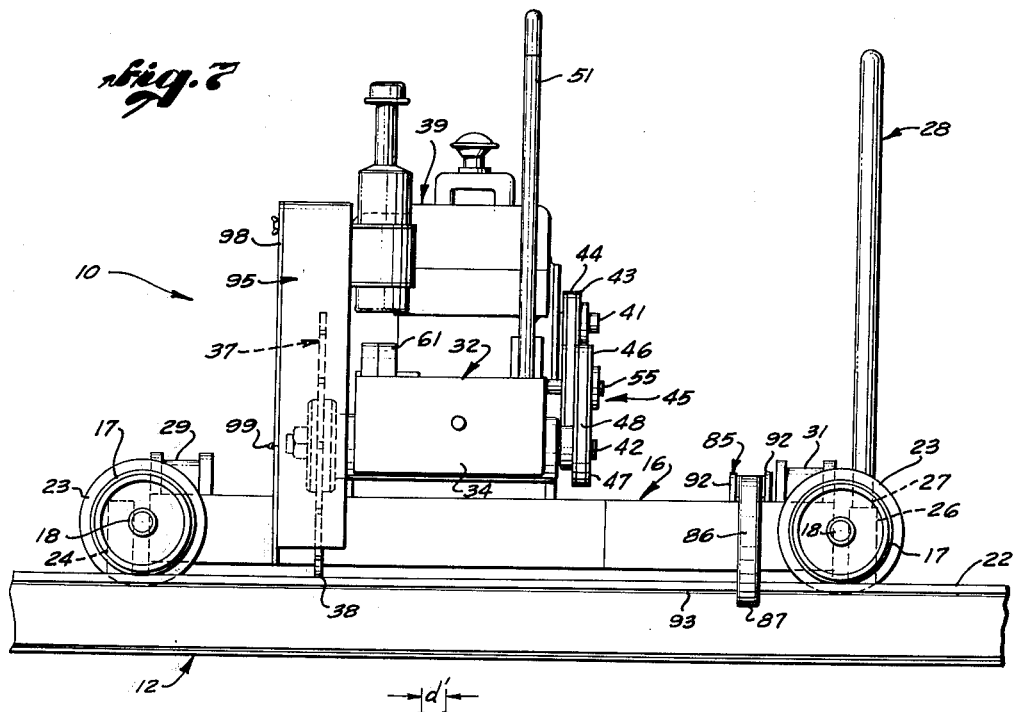
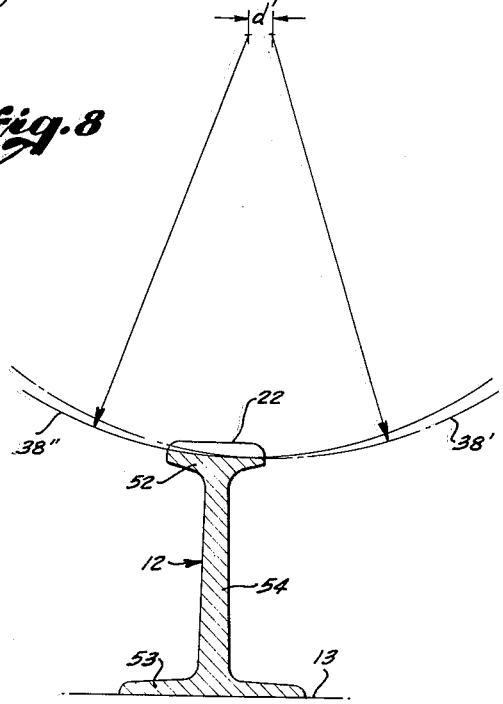
EDWARD F. OBEAR,
INVENTOR.
BY Warren T. Jessup
ATTORNEY.

United States Patent Office 3,046,707
Patented July 31, 1962

3,046,707
CUT-OFF SAW
Edward F. Obear, 940 W. Florence Ave.,
Los Angeles, Calif.
Filed Apr. 11, 1960, Ser. No. 21,390
6 Claims. (Cl. 51—178)

This invention relates to a cut-off saw and more particularly to a rail cutting saw for cutting transversely through one of a pair of spaced parallel rails such as the rails of a railroad track, or the like; it is to be understood, however, that the saw may be used to cut transversely through other work pieces.

Railroad tracks are normally comprised of a pair of spaced parallel rails, each of the rails including a plurality of elongated rail sections secured to the bed in end to end, abutting relationship. In the event that one of the rails is chipped or otherwise damaged, it has been, in the past, customary to replace the entire rail section which is damaged, to repair the rail, even though the injury is confined to a relatively small portion thereof. Such a practice is very costly and time consuming inasmuch as the rail sections are relatively long and comparatively expensive, resulting in an excess of waste of rail material.

It has been found, however, that it is more advantageous and less costly to replace merely the damaged portion of a rail section by transversely cutting the rail section on each side of the damaged portion and replacing the injured portion with a rail section of equal length. It is preferable, however, to perform such a cut-off, removal and replacement operation drectly at the location of the rail, rather than by removal of the entire rail section, cutting out of the damaged portion and then replacement of the remaining portions of the section and the substitute portion, inasmuch as removal of the rail section itself is time consuming and therefore a costly operation.

It is therefore an object of this invention to provide a new and improved cut-off saw which is capable of transversely cutting out selected portions of a longitudinal rail, or other member, without the necessity of removal of the rail member from its support, base or rail bed.

It is another object of this invention to provide a new and improved cut-off saw which is adapted to ride upon the rails so as to be movable thereon in a direction parallel thereto whereas the saw may be conveniently transported upon the rails to a desired location adjacent to an injured portion of the rail for cut off of the rail thereat.

It is a further object of this invention to provide a new and improved cut-off saw which is selectively engageable with the rail for cutting off thereof and is automatically biased out of engagement with the rail member.

It is a still further object of this invention to provide a new and improved cut-off saw of the character described which employs a rotating abrasive disc engageable with the rail member for cutting off thereof, the disc being oscillated or reciprocated in the plane of rotation for improved parti-sectional, progressive, transverse cutting of the rail member.

Yet another object of this invention is to provide a new and improved cut-off saw which in its improved cutting action eliminates the necessity for the use of a cooling agent to keep the work piece and disc from becoming excessively overheated and circumvents binding of the disc with the work piece.

Another object of this invention is to provide a new and improved cut-off saw which is selectively clampable to a selective portion of a rail member or work piece being cut to prevent longitudinal movement of the saw relative to the rail member during the transverse cutting operation.

A general object of this invention is to provide a new and improved cut-off saw which overcomes disadvantages of prior means and methods heretofore employed to accomplish generally similar purposes.

These and other objects of this invention will be more apparent from the detailed description, drawings and appended claims.

This invention provides a new and improved cut-off saw which comprises a carriage means preferably having a plurality of wheels arranged so as to be capable of riding on a pair of spaced, parallel rails, a frame pivotally mounted on the carriage means for pivotal movement about an axis intermediate its ends, a cutter disc rotatably mounted on one end of a frame for rotation in a plane transverse to the rails and overlying one of rails, a motor or other power drive means mounted on the opposite end of the frame, a pulley belt or other power transmission means connecting the motor and the cutter disc so as to rotate the cutter disc, and an eccentric shaft connecting the frame to the carriage and driven by the power transmission means to oscillate the cutter disc in its plane of rotation while rotating, the frame being selectively pivotable in a direction to engage the cutter disc with the rail for transversely cutting the rail and the cutter means being automatically biased out of engagement therewith.

Stop means are provided on the base and adjustably or otherwise engageable with the frame for limiting pivotal movement thereof, the stop means being rotatable so as to minimize wear due to frictional engagement resulting from the oscillation.

In the drawings:

FIGURE 4 is a top plan view, in elevation, of the cut-off saw of FIGURE 1;

FIGURE 5 is an enlarged, vertical, cross-sectional view, as taken substantially along the line 5—5 of FIGURE 2;

FIGURE 6 is a horizontal, cross-sectional view, as taken substantially along the line 6—6 of FIGURE 4;

FIGURE 7 is a side view, in elevation, of the cut-off saw illustrated in FIGURE 1; and FIGURE 8 is an enlarged, vertical, cross-sectional view as taken through one of the rail members, or work piece, diagrammatically illustrating the cutting action of the cut-off saw relative thereto.

Figure 1:
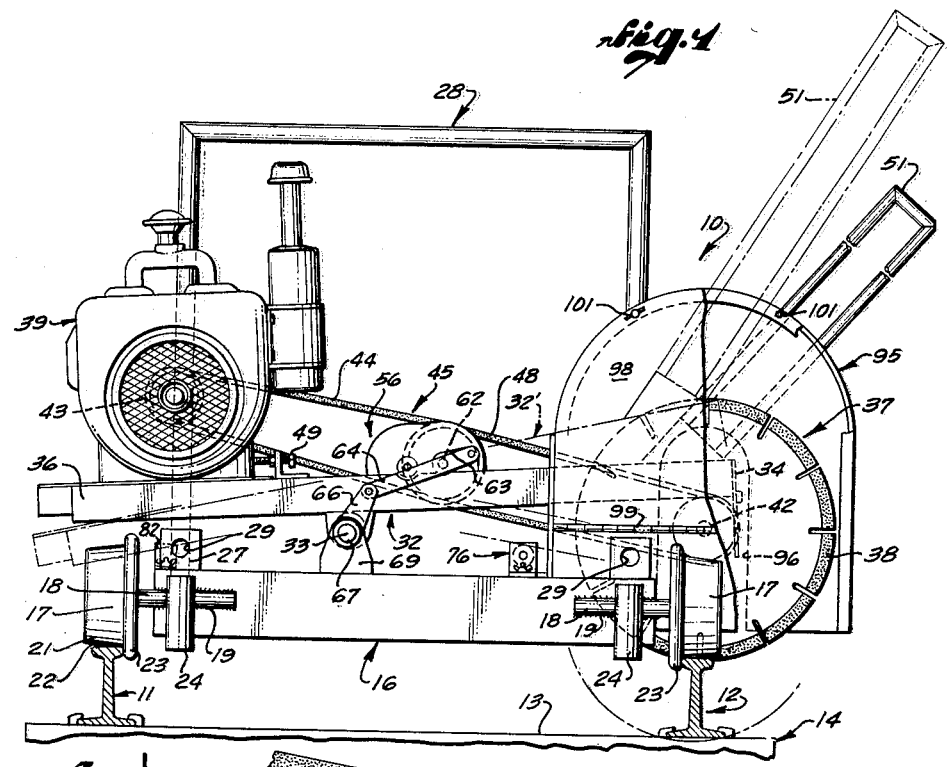
FIGURE 1 is an end view of the cut-off saw of this invention, illustrated as mounted on a pair of spaced parallel rails to be portable thereon.

Referring in detail to the drawings, there is shown, by way of illustration, but not of limitation, a cut-off saw, designed and constructed in accordance with this invention and generally referred to be the numeral 10.

The cut-off saw 10 is adapted to be portable on a pair of spaced, parallel rails designated by the numerals 11 and 12 and comprising longitudinal rails of a railroad track, or the like, secured to a plurality of transverse tie members 13 of a conventional road bed 14. For this purpose, the saw 10 comprises a base or carriage 16 having a plurality of wheels or rollers 17 rotatably mounted on transverse axles 18 secured to the base 16, as by welding 19, or the like. Each wheel 17 includes a cylindrical portion 21 adapted to ride on the upper surface 22 of the rails 11 and 12 and inner annular flanges 23 forming guides to retain the rollers or wheels 17 on the rails 11 and 12 thereby to prevent lateral movement of the base 16 relative to the rails. The base 16 is thereby supported between and above the rails 11 and 12 for longitudinal movement relative to the rails.

To facilitate movement of the base 16, a pair of spaced, tubular, vertical sockets 24 are secured, as by welding or the like, to one end of the base 16, and a similar pair of sockets 26 are similarly secured to the other end of the base 16 which are adapted to receive the lower ends 27 of an inverted U-shaped handle member 28, the handle 28 providing a convenient grip against which a manual force may be imparted for moving the base 16 along the rails 11 and 12. The handles 28 are removable from the sockets 24 or 26 and insertable into horizontal sockets 29 and 31, a pair of each being secured to opposing ends of the base 16 to facilitate lifting of the base 16 from the rails 11 and 12. By inserting the free ends 27 of one handle like 28 in the sockets 29 and the corresponding free ends of another handle like 28 in the sockets 31, the base 16 may be conveniently lifted by the lifting force of one man at each of the handles 28 to install the device 10 on the tracks or to remove the device from the tracks.

In FIGURE 4, the handle 28 is shown in a vertcial position in sockets 26 to illustrate the example in which the handle 28 is positioned for manual pushing or pulling, and is shown in broken lines 28' illustrating its relative position for the purpose of lifting the base 16.

A frame, generally designated by the numeral 32, is pivotally mounted on the base 16 for transverse pivotal movement relative to the base about an axis 33 intermediate of its ends 34 and 36. A cutter means 37, comprising an abrasive disc 38, is rotatably mounted on one of the ends, such as the end 34 overlying a rail 12, the disc 38 being rotatable in a plane transverse to the rail 12 and engageable with the rail in response to pivotal movement of the frame 32 to lower the disc 38 for cutting through of the rail 12.

A power drive means, generally designated by the numeral 39 is mounted on the opposite end 36 of the frame 32 and includes the driven shaft 41 extending outwardly therefrom.

The rotation of the shaft 41 is transmitted to an arbor shaft 42, to which the abrasive disc 38 is keyed and secured, by a pulley 43, keyed to the shaft 41 and connected by an endless friction belt 44 to a pulley 46, the pulley 46 being connected to a pulley 47, keyed to the arbor 42, by an endless friction belt 48. The pulleys 43, 46 and 47, driven by the pulley belts 44 and 48, constitute a power transmission means 45 for transmitting the rotation of the shaft 41 to the arbor shaft 42, for constant rotation of the abrasive disc 38 during operation of the engine 39. The tension of the belt 44 may be adjusted by the provision of one or more set screws 49 adjustably secured to the frame 32 and engageable with the body of the engine 39.

A handle 51 is secured to the frame 32, as by welding, or the like, to facilitate manual pivoting of the frame 32 relative to the base 16 to engage the cutter disc 38 with the rail 12 for cutting therethrough. The power drive means 39 is appreciably greater in weight than the cutter 38 whereby the frame 32 is automatically biased into the position to disengage the disc 38 from the rail 12, such disengaged position being indicated in the broken outline of the frame as at 32' wherein the handle 51 is indicated at 51'.

A conventional rail section, like the rails 11, 12, is generally I-shaped in cross-section with a substantially wide transverse section 52 at its upper end and a transverse section 53 at its lower end, the sections 52 and 53 being joined by a relatively thin section 54. In experience it has been found that a saw blade is substantially belabored during a cutting operation when it is extended through the rail in a substantially linear motion in a conventional manner. It has been further experienced that when a rotating saw is oscillated or reciprocated transversely to the rail while it is being pressed there-against in a linear movement, the cutting action is appreciably faster, binding of the saw within the cut is eliminated or greatly decreased, and the saw blade 38 and the work piece 12 are heated to a far lesser degree, resulting in faster and smoother cutting of the rail 12 and an appreciably longer life span of the cutter disc 38.

Therefore, in accordance with this invention, the abrasive disc 38 is oscillated or reciprocated transversely to the rail 12 while it is being rotated and biased into engagement with the rail for cutting therethrough, by an oscillating means generally designated by the numeral 56 and connecting the frame 32 with the base 16, the oscillating means 56 being actuated by the power transmission means 45 previously described.

The frame 32, and thereby the cutter means 37, is oscillated in the following manner:

The intermediate pulley 46 of the power transmission means is secured to a transverse shaft 55 journalled on the frame 32, as at 58, and includes an opposite end 59 secured to a gear reduction means 61 having an output shaft 62, whereby rotation of the shaft 41 is transmitted to the shaft 55 and through the reduction gear means 61 to a rotation of substantially reduced speed of the output shaft 62. A crank arm 63 is secured to the shaft 62 for rotation therewith and is connected by a link 64 to a crank arm 66 secured to a reduced end 67 of the shaft 57 forming the pivot axis 33 for the frame 32 relative to the base 16.

The reduced end 67 and an opposing, coaxial end 68, are each respectively journalled in upstanding brackets 69 and 71 secured to the upper surface of the base 16. The shaft 57 includes a substantially enlarged, eccentric intermediate portion 72 journalled in a bearing sleeve 73 secured to the underside of the frame 32.

Figure 2:
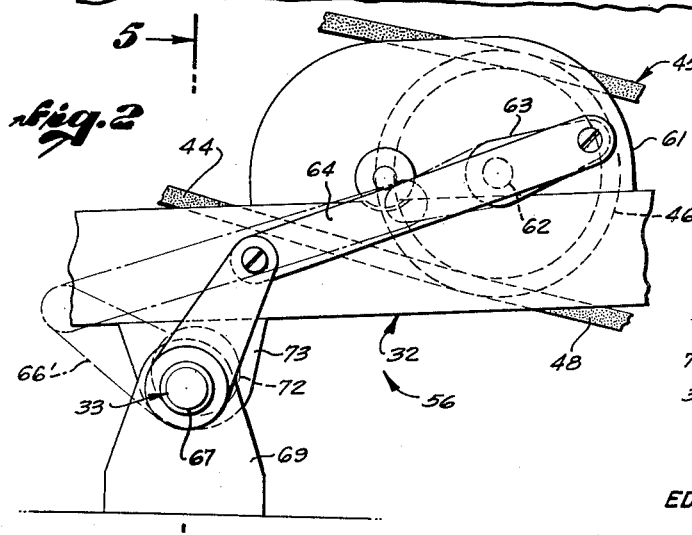
FIGURE 2 is an enlarged, fragmentary, side view of the oscillating means of the cut-off saw of FIGURE 1, illustrating parts thereof in greater detail.
Figure 3:
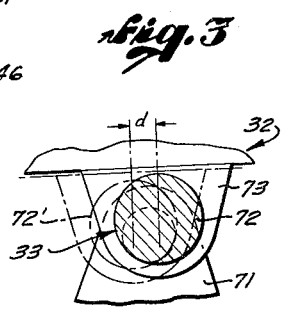
FIGURE 3 is a vertical, cross-sectional view, as taken substantially along the line 3—3 of FIGURE 5, illustrating the oscillating means in greater detail.

As best seen in FIGURE 2, the rotation of the crank arm 63 results in a segmental pivotal movement of the crank arm 66 from the position shown in solid line to the position shown in broken lines 66' and back again to the solid line position for each rotation of the crank arm 63. This segmental pivotal movement of the crank arm 66 and therefore partial and reciprocal rotation of the ends 67 and 68 results in an oscillation of the intermediate eccentric portion 72 of the shaft 57 between the solid line section of FIGURE 3 and the broken line position 72' of the same figure, there being a transverse displacement of the eccentric portion 72, and thereby the frame 32, a distance designated by the dimension "d" in FIGURE 3. This distance of the frame 32, transversely of the base 16, and thereby the rail 12, is designated in FIGURE 8 as "d" as signifying the corresponding distance of oscillation of the cutter disc 38 illustrated as arcuate lines 38' and 38".

It will now be more clearly seen and understood that as the rotation of the shaft 41 of the power drive means is transmitted into rotation of the abrasive disc 38, the oscillating means 56 is simultaneously actuated to oscillate the frame 32 and thereby the abrasive disc 38 transversely of the rail 12 to effect a back and forth movement of the cutter 38 as it is rotating. Inasmuch as the disc 38 is oscillating back and forth while it is rotating, as best seen in FIGURE 8, the saw cuts through a substantially small transversely progressive sections of material of the rail 12 as it passes through the sections 52, 54 and 53 to produce a smoother, faster and cooler operating sawing action.

A first stop means 76 is adjustably secured to the upper surface of the base 16 and engageable with the underside of the end 34 of the frame 32 for limiting the depth of cut of the cutter disc 38 to prevent excessive cutting of the tie 13 after the disc 38 has passed through the entire rail section 12. To reduce wear on the stop member, due to the constant oscillation of the frame 32 bearing thereagainst, the stop member 76 preferably includes a rotatable member 77 secured at its ends to adjustable brackets 78.

A second stop means 79, similar to the first stop means 78 is preferably provided on the base 16 and engageable with the opposing end 36 of the frame 32 to limit pivotal movement of the frame 32 in a direction to disengage the cutter 38 from the reel 12. The second stop means 79 is preferably similar in construction to the first stop means 76 and includes a rotatable transverse member 81 journalled at its ends in adjustable brackets 82 secured to the base 16. In this manner, rails of various sizes may be cut off by adjusting the stop members 76 and 79. It is to be understood, however, that the stop members 76 and 79 may be optionally secured to the frame 32 engageable with the base 16.

To prevent longitudinal movement of the base 16 relative to the rails 11 and 12 during the cut-off operation described above, a clamping means 85 is preferably provided to clamp the base 16 to the workpiece, such as the rail 12. The clamping means 85, as best seen in FIGURES 4 and 6, includes an arm 86, having a hooked end 87, pivotally secured as at 88 to a lever member 89 having bifurcated ends 91 pivotally secured to upstanding brackets 92 secured on the base 16. The hooked end 87 is engageable with the outer, underside surface 93 of the upper section 52 of the rail member 12 and the pivotal connection 88 is pivotable into an over-center position by the downward movement of the lever 89 to lock the hooked end 87 in firm engagement with the rail 12. The hooked end 87 may be disengaged from the rail 12 by upward pivotal movement of the lever 89.

The abrasive disc 38 is preferably covered by a guard member 95 secured to the base 16, as by welding or the like. The guard 95 forms a housing to envelope the disc 38 and is provided with an elongated vertical slot 96 for permitting relative movement of a bearing 97 in which the arbor 42 is journalled. An access door 98 is preferably provided, hinged as at 99 and temporarily secured as at 101, whereby the disc 38 in its uppermost position may be easily and readily secured to the arbor 42 or removed therefrom.

While the instant invention has been shown and described herein in what is conceived to be the most practical and preferred embodiment, it is recognized that departures may be made therefrom within the scope of the invention which is therefore not to be limited to the details disclosed herein but is to be afforded the full scope of the claims.

What is claimed as new and desired to secure by Letters Patent is:

1. A rail cutting device comprising: carriage means having a plurality of wheels arranged so as to ride on a pair of spaced, parallel rails; frame means having ends and pivotally mounted on said carriage means for pivotal movement about a transverse axis intermediate said ends; cutter means rotatably mounted on one end of said frame means for rotation in a plane transverse to said rails and said axis of pivotal movement and overlying one of said rails; power drive means mounted on the opposite end of said frame means and having a driven shaft; power transmission means connecting said power drive means and said cutter means for translating rotation of said driven shaft into rotation of said cutter means, and oscillating means actuatable by said power transmission means for oscillating said axis of pivotal movement so as to oscillate said frame means and thereby said cutter means during rotation of said cutter means, said frame means being pivotable in a direction to engage said cutter means with said one rail for transversely cutting said one rail.

2. A rail cutting device, as defined in claim 1, including first rotatable stop means on said carriage means and engageable with said frame means for limiting relative pivotal movement of said frame means in one direction, including second rotatable stop means on said carriage and engageable with said frame means for limiting relative pivotal movement of said frame means in an opposite direction, said cutter means being clear of said one rail when said frame means is stopped in said one direction and said cutter means having completely cut through said one rail when said frame means is stopped in said opposite direction.

3. A rail cutting device, as defined in claim 1, including clamping means pivotally secured on said carriage means and embraceable over said one of said rails for clamping said carriage to said one of said rails and against movement relative to said rail.

4. A rail cutting device comprising: carriage means having a plurality of wheels arranged thereon so as to ride on a pair of spaced, parallel rails for linear movement thereon; cutter means pivotally and rotatably mounted on said carriage means and adapted to overlie one of said rails for pivotal movement into engagement with said one rail and for rotation in a vertical plane transverse to said one rail; power drive means associated with said cutter means for pivotal movement therewith; power transmission means connecting said power drive means and said cutter means for selectively rotating said cutter means; and means connected to and actuatable by said power transmission means for oscillating said cutter means during rotation thereof, said cutter means being pivotable into engagement with said one rail during rotation thereof for transversely cutting said one rail.

5. A cut-off saw comprising: a base; frame means having ends and pivotally mounted on said base for pivotal movement about an axis intermediate said ends; cutter disk means rotatably mounted on one of said ends of said frame means; power drive means mounted on the opposite of said ends of said frame means, and having a driven shaft; oscillating means connecting said base and said frame means for oscillating said axis of pivotal movement of said frame means relative to said base; and power translating means connecting said power drive means, said oscillating means and said cutter disk means for translating rotation of said driven shaft into simultaneous rotation and oscillation of said cutter disk means, said cutter disk means being selectively pivotable into engagement with a workpiece during rotation and oscillation for cutting the workpiece.

6. A cut-off saw, as defined in claim 5, wherein said oscillating means includes: a first transverse shaft, rotatably mounted on said frame means and driven by said power translating means and a second transverse shaft rotatably mounted on said base, said second shaft defining said axis of pivotal movement and having an eccentric portion journalled on said frame means; and linkage means connecting said first and second shafts so as to translate rotation of said first shaft into an oscillation of said secnod shaft, said eccentric portion being arranged relative to said frame means so as to translate the oscillation of said second shaft into a back and forth movement of said frame means, and thereby said cutter means, transversely relative to the workpiece.

References Cited in the file of this patent

UNITED STATES PATENTS

| 530,639 | Ehrhardt | Dec. 11, 1894 |
| 2,257,480 | Perazzoli | Sept. 30, 1941 |

FOREIGN PATENTS

| 179,507 | Great Britain | June 29, 1922 |
| 449,577 | Italy | June 22, 1949 |